J. A. FRANKLIN.
MALTED MILK DISPENSER AND MIXER.
APPLICATION FILED MAR. 26, 1921.
1,437,644.
Patented Dec. 5, 1922.
2 SHEETS—SHEET 1.
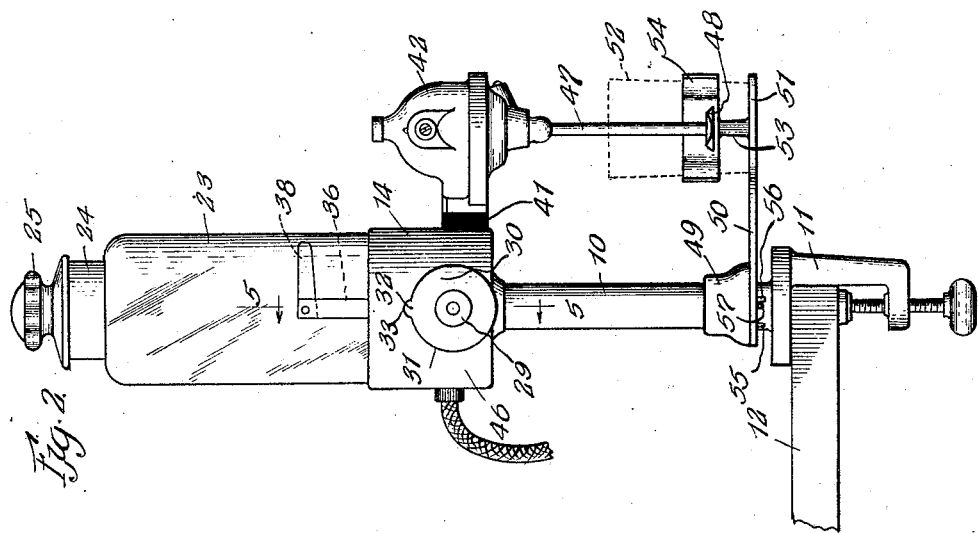
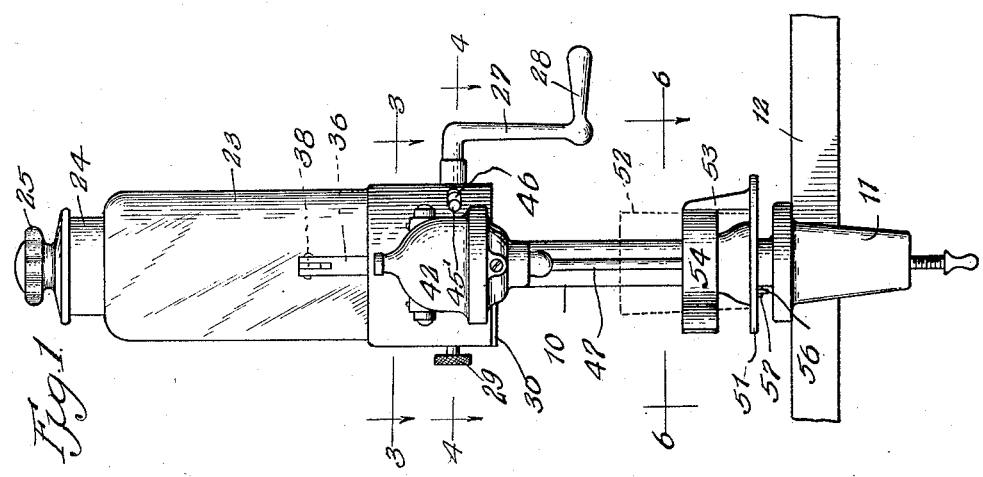
Witness.
Carl G. Anderson.
Inventor.
Joseph A. Franklin.
By Samuel N. Pond
Atty.

J. A. FRANKLIN.
MALTED MILK DISPENSER AND MIXER.
APPLICATION FILED MAR. 26, 1921.
1,437,644.
Patented Dec. 5, 1922.
2 SHEETS—SHEET 2.
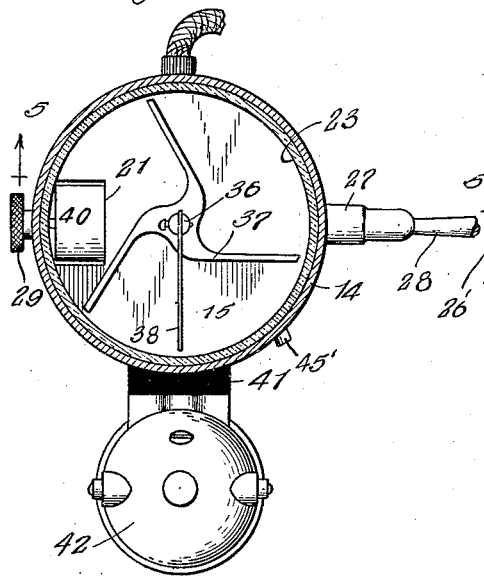
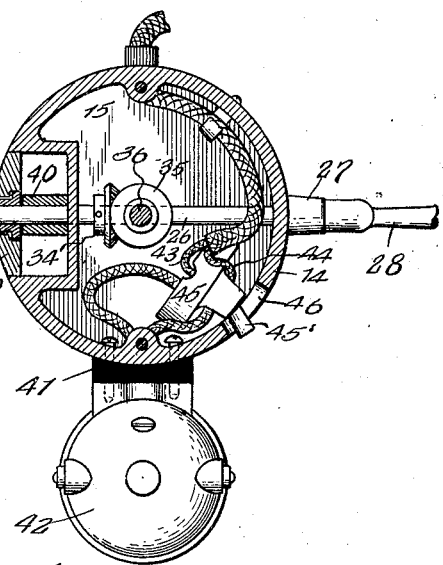
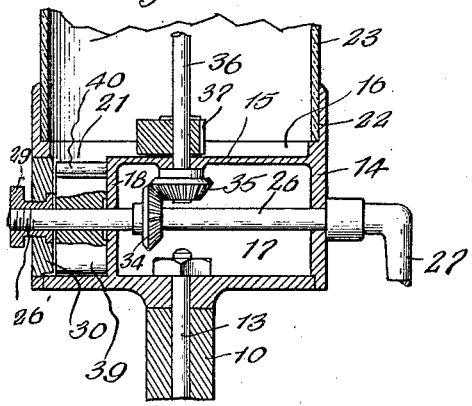
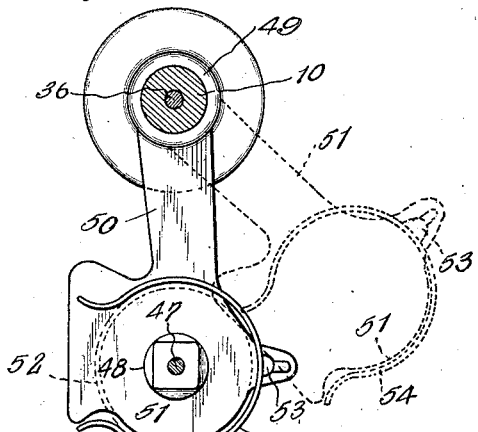
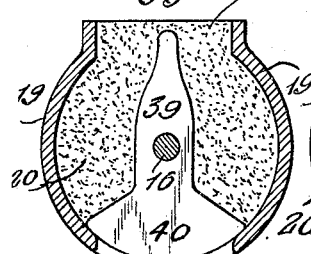
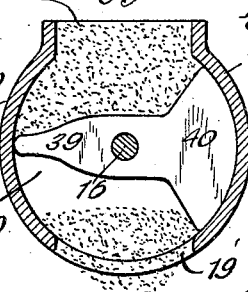
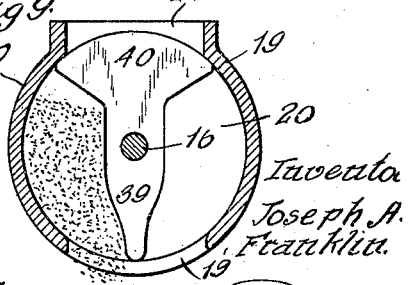
Inventor
Joseph A. Franklin
By Samuel N. Pond Atty.
Witness
Carl Henderson Patented Dec. 5, 1922.

1,437,644

UNITED STATES PATENT OFFICE.

JOSEPH A. FRANKLIN, OF CHICAGO, ILLINOIS, ASSIGNOR TO SPEED KING MANUFACTURING CO., A CORPORATION OF ILLINOIS.

MALTED-MILK DISPENSER AND MIXER.

Application filed March 26, 1921. Serial No. 455,937.

*To all whom it may concern:*

Be it known that I, JOSEPH A. FRANKLIN, a citizen of the United States, residing at Chicago, in the county of Cook and State of Illinois, have invented certain new and useful Improvements in Malted-Milk Dispensers and Mixers, of which the following is a specification.

This invention relates to a combined device for dispensing and mixing malted milk and like drinks at soda fountains and similar places where mixed drinks of this character are dispensed; and the main object of the invention is to produce a simple, inexpensive and efficient device by which measured charges of malted milk or similar powdered material may be deposited in the mixing cup, and after the milk syrups and other ingredients of the mixture have been added, be thoroughly stirred.

Another object of the invention is to provide a new and improved combined structure of malted milk container, dispenser, mixer and mixing cup holder or support, which shall effect an economy of space at the soda fountain, and simplify the operations involved in preparing the drink for the customer.

In carrying out my invention, I provide a suitable casing mounted on a post that may be clamped or otherwise secured to the counter, a malted milk holder or receptacle mounted on and at its lower end open to the dispensing mechanism in said casing, a crank operated mechanism in said casing for delivering a measured charge of malted milk at each complete turn of the crank, an electric motor attached to one side of said casing and directly driving a depending mixer spindle, and an arm mounted to swing on said post and carrying a cup support and clamp movable, by the lateral swinging of said arm, toward and from a position directly under the mixer spindle and motor.

In order that my invention may be clearly understood by those skilled in the art I have illustrated in the accompanying drawing one embodiment thereof which has been found in practice to satisfactorily effect the stated objects of the invention, and referring thereto—

Fig. 1 is a front elevation of my improved dispenser and mixer;

Fig. 2 is a side elevation of the same, as viewed from the left of Fig. 1;

Fig. 3 is an enlarged horizontal section taken on the line 3—3 of Fig. 1;

Fig. 4 is a similar section taken on the line 4—4 of Fig. 1;

Fig. 5 is a central vertical section taken on the line 5—5 of Fig. 2;

Fig. 6 is a horizontal section taken on the line 6—6 of Fig. 1; and

Figs. 7, 8 and 9 are enlarged vertical sections taken through the measured charge delivery device, illustrating different positions of the rotary valve.

Referring to the drawing—

10 designates a round post or standard, rigid with the lower end of which is a clamp 11 by which it may be securely mounted on a counter or table 12. Secured on top of the post 10, as by a bolt 13 (Fig. 5) is a cup-shaped casing 14 divided by a horizontal partition 15 into upper and lower chambers 16 and 17, respectively. A portion of the lower chamber 17 is divided off by a flat vertical partition 18 and circular side walls 19 to form a chamber 20 that communicates through an opening 21 in the partition 15 with the upper chamber 16 of the casing. The vertical wall of the upper chamber 16 is counter-sunk, as shown at 22 to receive and support the lower open end of a glass flask 23 which contains the malted milk or other material to be dispensed, and has at its upper end an open neck 24 that may be closed by a glass stopper 25.

Journaled in and across the lower chamber 17 of the casing is a horizontal shaft 26 provided on one end with a crank arm 27 and a handle 28. The shaft 26 extends through the discharge chamber 20 and has a threaded end 26' which screws into a nut 29 that is rotatably mounted in a cover plate 30 fitting and closing a circular opening 31 (Fig. 2) in the side wall of the casing 14, said cover plate being held against turning when the crank is turned by a locking lug 32 engaged with a notch 33 in the edge of the opening 31.

Keyed on the shaft 26 is a miter gear 34 that meshes with and drives a miter gear 35 fast on the lower end of a vertical spindle 36 that is journaled in the partition 15 and has keyed thereon a sweep 37 (Fig. 3), the arms of which successively sweep across the discharge opening 21.

On the upper end of the spindle 36 is a radial arm 38 (Fig. 2) that constitutes an agitator or stirrer for the body of material contained in the flask 23. Fast on the shaft 26 within the circular discharge chamber 20 is a rotary measuring valve 39, formed with a sector-shaped head 40 that fits and slidably engages with the interior circular wall of the casing, and alternately opens and closes at each revolution a discharge port 19' in the lower end of the circular wall 19 of the valve casing. In the idle position of the device, the valve head 40 closes and seals the discharge opening 19' against the entrance of moisture which tends to cake the malted milk and prevent it from flowing freely. At each complete revolution a fixed amount or charge is delivered by the valve.

Secured externally to the circular wall of the casing 14, through an interposed block 41 of insulating material, is an electric motor designated as an entirety by 42. The motor 42 is supplied with current through circuit wires 43, and 44 (Fig. 4), which are led into the chamber 17 on the opposite side of the casing from the motor, and include therein a circuit opening and closing switch designated generally by 45, the operating handle 45' of which extends through a slot 46 in the wall of the casing. The armature of the motor carries a depending stirrer spindle 47 having on its lower end the usual mixing disc 48.

Rotatably and slidably mounted on the post 10 is a collar 49, to which is rigidly secured a radially extending arm 50 terminating at its outer end in a broad flat seat 51 of sufficient size to form a rest or support for the bottom of the mixing cup or glass indicated by dotted lines at 52. On one side of the plate 51 is a rigid post 53, to which is secured a curved spring metal clip or clamp 54 adapted to yieldingly embrace the drinking cup or glass 52 when the latter is placed upon the support 51. The arm 50 is designed to swing to a limited extent sufficient to carry the cup holder to and away from a position directly beneath the mixer spindle 47. For this purpose I have formed on the lower side of the arm 50 a pair of depending pins 55 and 56 (Fig. 2) which alternately engage with a stop lug 57 projecting from the post 10.

In the use of my improved device, assuming that the flask 23 contains a body of malted milk or other powdered material to be dispensed as a drink ingredient, the mixing cup 52 is held beneath the discharge opening 19' and the crank is given one complete turn. This deposits a measured charge of material in the cup. The milk, sirup, egg, or other ingredient or ingredients are then added to the malted milk, and the filled cup is then entered by hand over the spindle 47 of the mixer, with the bottom of the cup at or above the level of the swinging support 51. With the other hand the arm 50 is swung in a direction toward the cup until the support 51 slides beneath the cup and the clamp 54 embraces the latter. The clerk then throws the switch 45' in a direction to energize the motor 42, and the ingredients of the drink are thoroughly agitated and mixed. As soon as the mixing is complete, the clerk grasps the glass with one hand, swings the support and clamp away from the glass with the other, withdraws the glass from beneath the mixer spindle, and passes it to the customer.

From the above it will be apparent that the device of the present invention is of very simple structure, involving no complicated and elaborate internal mechanism; is very compact, requiring but a minimum of space on the counter; is easily and rapidly manipulated; and presents a neat and attractive appearance. By locating the electric motor externally of the casing or housing of the holder and dispenser, any defect in the motor is easily gotten at and remedied without having to open up or partly dismantle the casing and its contained devices.

I am aware that it has heretofore been proposed to combine a motor driven drink dispenser and mixer in a single organized structure, and I make no claim broadly to such an organization. The described relative arrangement of the dispenser, the mixer, and the cup holder herein presented is, however, believed to be new and useful, and an improvement upon previous known devices of this general character.

Manifestly the details of the invention herein shown and described may be variously modified without changing the character of the invention or lessening its advantages; and hence I reserve such variations and modifications as fall within the spirit and purview of the appended claims.

I claim:

1. In a combined drink dispenser and mixer of the character described, the combination of a supporting standard, a casing mounted on said standard, a measured charge dispensing mechanism in said casing, an ingredient receptacle mounted on and communicating with the interior of said casing, a motor mounted on and exteriorly of said casing, a depending mixer spindle driven by said motor and a support for the drink receptacle shiftable to dispose its receptacle supporting portion beneath either said charge dispensing mechanism or said mixer spindle.

2. In a combined drink dispenser and mixer of the character described, the combination of a supporting standard, a casing mounted on said standard, a measured charge dispensing valve in said casing, a hand crank for actuating said valve, an ingredient receptacle mounted on said casing and communicating with said valve, an electric motor mounted on and exteriorly of a side wall of said casing, a depending mixer spindle driven by said motor and a support for the drink receptacle shiftable to dispose its receptacle supporting portion beneath either said charge despensing valve or said mixer spindle.

3. In a combined drink dispenser and mixer of the character described, the combination of a supporting standard, a casing mounted upon said standard, a measured charge dispensing valve in said casing, a valve actuating shaft journaled in said casing, a hand crank on said shaft, an ingredient receptacle mounted on said casing and communicating with said valve, an electric motor mounted on and exteriorly of a side wall of said casing, a depending mixer spindle driven by said motor, circuit wires for said motor leading into and through said casing and a pivoted support for the drink receptacle that may be swung so as to dispose its receptacle supporting portion beneath either said dispensing valve or said mixer spindle.

4. In a combined drink dispenser and mixer of the character described, the combination of a post, a casing mounted on said post, a measured charge dispensing mechanism in said casing, an ingredient receptacle mounted on and communicating with the interior of said casing, a motor mounted on said casing, a depending mixer spindle driven by said motor, and a cup holder mounted on said post to swing horizontally toward and from said spindle.

5. In a combined drink dispenser and mixer of the character described, the combination of a post, a casing mounted on said post, a measured charge dispensing mechanism in said casing, an ingredient receptacle mounted on and communicating with the interior of said casing, an electric motor mounted on a side wall of said casing, a depending mixer spindle driven by said motor, an arm mounted to swing horizontally on said post, and a cup rest and clamp carried by the free end of said arm.

6. In a combined drink dispenser and mixer of the character described, the combination of a post, a casing mounted on said post, a measured charge dispensing mechanism in said casing, an ingredient receptacle mounted on and communicating with the interior of said casing, an electric motor mounted on a side wall of said casing, a depending mixer spindle driven by said motor, an arm mounted to swing horizontally on said post, a cup rest and clamp carried by the free end of said arm, and stop devices limiting the extent of swing of said arm.

JOSEPH A. FRANKLIN.